US010089388B2

(12) United States Patent
Murphy et al.

(10) Patent No.: US 10,089,388 B2
(45) Date of Patent: Oct. 2, 2018

(54) OBTAINING SEARCH RESULTS

(71) Applicant: AirWatch LLC, Atlanta, GA (US)

(72) Inventors: Gerard Murphy, Lawrenceville, GA (US); Marcos Mendez, Alpharetta, GA (US)

(73) Assignee: AIRWATCH LLC, Atlanta, GA (US)

( * ) Notice: Subject to any disclaimer, the term of this patent is extended or adjusted under 35 U.S.C. 154(b) by 338 days.

(21) Appl. No.: 14/673,269

(22) Filed: Mar. 30, 2015

(65) Prior Publication Data
US 2016/0292273 A1   Oct. 6, 2016

(51) Int. Cl.
G06F 17/30   (2006.01)

(52) U.S. Cl.
CPC ............... G06F 17/30696 (2013.01)

(58) Field of Classification Search
CPC ......... G06F 17/30398; G06F 17/30554; G06F 17/30696; G06F 17/30864; G06F 3/0481; G06F 17/212; G06F 17/30719
USPC ....... 707/722, 724, 725, 732, 759, 764, 769, 707/770; 715/804, 968, 243, 246, 247, 715/249, 253, 254
See application file for complete search history.

(56) References Cited

U.S. PATENT DOCUMENTS

| | | | |
|---|---|---|---|
| 5,675,819 A | 10/1997 | Schuetze | |
| 5,757,983 A | 5/1998 | Kawaguchi | |
| 7,092,938 B2 | 8/2006 | Brown | |
| 7,424,672 B2* | 9/2008 | Simske | G06K 9/00442 715/243 |
| 7,743,056 B2 | 6/2010 | Meisels et al. | |
| 7,788,711 B1 | 8/2010 | Sun et al. | |
| 8,103,653 B2 | 1/2012 | Newbold | |
| 8,346,739 B1 | 1/2013 | Hatton | |
| 8,522,148 B1* | 8/2013 | Pry | G06F 17/30864 715/745 |
| 8,731,529 B2 | 5/2014 | Lindeman et al. | |
| 8,818,986 B1 | 8/2014 | Delker et al. | |
| 8,849,810 B2* | 9/2014 | Lucovsky | G06F 17/30864 707/728 |
| 9,317,587 B2* | 4/2016 | Dahn | G06F 17/3066 |
| 2001/0032218 A1 | 10/2001 | Huang | |
| 2001/0053252 A1 | 12/2001 | Creque | |
| 2002/0049753 A1 | 4/2002 | Burrows | |
| 2004/0064475 A1* | 4/2004 | Maeda | G06F 17/30905 |
| 2004/0103090 A1* | 5/2004 | Dogl | G06F 17/30643 |
| 2005/0216859 A1* | 9/2005 | Paek | G06F 3/0481 715/810 |
| 2006/0047551 A1 | 3/2006 | Cotten et al. | |
| 2007/0220268 A1 | 9/2007 | Krishnaprasad et al. | |
| 2007/0271235 A1 | 11/2007 | Frank et al. | |

(Continued)

OTHER PUBLICATIONS

Office Action dated Aug. 11, 2017 for U.S. Appl. No. 14/673,273.

(Continued)

*Primary Examiner* — Greta Lee Robinson
(74) *Attorney, Agent, or Firm* — Thomas | Horstemeyer, LLP

(57) ABSTRACT

A search client executable in a computing device transmits a search term to a search engine. The search client obtains a search result from the search engine. The search client generates a rendering of the search result using a document structure and a document layout provided by the search engine. The rendering of the search result comprises contextual content for the search term.

20 Claims, 6 Drawing Sheets

(56) References Cited

U.S. PATENT DOCUMENTS

| | | |
|---|---|---|
| 2008/0065602 A1 | 3/2008 | Cragun et al. |
| 2008/0082571 A1 | 4/2008 | Sakai et al. |
| 2008/0114724 A1 | 5/2008 | Indeck |
| 2008/0148144 A1 | 6/2008 | Tatsumi |
| 2008/0184107 A1 | 7/2008 | Chew |
| 2009/0063500 A1 | 3/2009 | Zhai et al. |
| 2009/0204926 A1* | 8/2009 | Cochrane .......... G06F 8/33 715/781 |
| 2012/0278212 A1 | 11/2012 | Upadhyaya et al. |
| 2013/0054574 A1* | 2/2013 | Turchetto .......... G06F 17/30861 707/722 |
| 2014/0149592 A1 | 5/2014 | Krishna |
| 2014/0181088 A1* | 6/2014 | Schwob .......... G06F 17/30554 707/722 |
| 2014/0280049 A1* | 9/2014 | Penha .......... G06F 17/30554 707/722 |
| 2014/0344446 A1 | 11/2014 | Rjeili et al. |
| 2015/0039887 A1 | 2/2015 | Kahol et al. |
| 2015/0186365 A1 | 7/2015 | Pitzo |
| 2015/0248649 A1 | 9/2015 | Avats |
| 2016/0063121 A1 | 3/2016 | Agarwal et al. |
| 2016/0119323 A1 | 4/2016 | Krishna |
| 2016/0292279 A1* | 10/2016 | Murphy .......... G06F 17/30867 |

OTHER PUBLICATIONS

Non-final office action mailed in related U.S. Appl. No. 14/673,281; dated Apr. 7, 2017.

Non-Final Office Action for U.S. Appl. No. 14/739,972 dated Oct. 19, 2017.

Final Office Action for U.S. Appl. No. 14/673,273 dated Nov. 27, 2017.

Office Action dated Feb. 8, 2018 for U.S. Appl. No. 14/673,273.

* cited by examiner

200b

```
Content Locker – Search Results for "de-icing"                    _ □ X
File    Edit    View    Tools    Help
```

Search results for "de-icing"                      User: MechanicMax
24 instances of "de-icing" in 6 documents                  Logout From "Mechanic's Manual for the G430 Aircraft:"

133d — The De-Icing System of the G430

The de-icing system of the G430 includes four de-icing solution tanks coupled to electric pumps. The power supplies for each de-icing solution tank are redundant to improve system reliability. Each de-icing solution tank provides de-icing solution to a respective spray nozzle.

⊕ ⊖

Page 8, paragraph 13

From "A Mechanic's Guide to Repairing De-Icing Systems

133e — *De-icing systems facilitate the removal of ice from the surface of an aircraft. Although various types of de-icing systems exist, all de-icing systems include a de-icing solution tank and a nozzle.*

⊕ ⊖

Page 2, paragraph 14

From "G430 Ground Operations Manual for Line Operators:"

133f — Filling The De-Icing Solution Tanks

For the G430, it is essential that the tanks for de-icing solution be filled to capacity prior to take off. To fill the tanks, remove the blue cap for the de-icing solution tanks. Slowly fill the tanks to the fill line, and then tighten the blue cap.

⊕ ⊖

Page 8, paragraph 2

Next >>

FIG. 2B

OBTAINING SEARCH RESULTS

BACKGROUND

Individuals use computing devices to edit, store, and access electronic documents, such as word processing documents and spreadsheets. Electronic documents typically include text and graphics that are rendered for presentation for a user. Enterprises, such as businesses and other organizations, typically have a large number of electronic documents stored in its computing systems.

In some situations, an enterprise provides a search engine that searches the electronic documents. In these situations, a user submits a search term, such a word or phrase to the search engine. Upon receiving the search term from the user, the search engine searches for documents that are deemed relevant to the search term. The search engine then generates search results, which are presented to the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2B are drawings of examples of user interfaces for a search client in a client device.

DETAILED DESCRIPTION

The present disclosure relates to generating search indexes for electronic documents and using these search indexes to generate search results that are relevant for users of an enterprise. In some examples, a search indexer obtains a copy of document file, which includes content encoded in a proprietary or open file format, such as a MICROSOFT WORD document format, as a portable document format (PDF), or MICROSOFT POWERPOINT document format. Upon obtaining the document file, the search indexer extracts a platform-independent form of the document, including a document layout and a document structure. The document structure defines the logical structure of content of the document, and the document layout defines a visual layout of the content of the document.

The search indexer parses the extracted document structure to identify key terms in the document. For each identified term, the search indexer populates a search index with data that specifies the location of the term within the document structure as well as data that defines a contextual boundary for the word or phrase. This contextual boundary defines a portion of the document's content, including text and graphical elements, that can be presented to a user in order to provide context regarding that term within the document.

When a user performs a search query, a search processor consults the search index for information regarding terms that are relevant to the search query and information regarding the relevant terms is presented to the user. In particular, the content within the defined content boundaries are presented to the user to provide context regarding terms within the document. In some examples, the content within the content boundaries is presented using the same formatting as used in the original document file. In addition, the search processor has access to data regarding the user who performed the search, such as information defining the user's role in an enterprise. Accordingly, the search processor filters and arranges search results so that search results that are relevant to the user's role in the enterprise are surfaced to the user.

In the following discussion, examples of systems and their components are described, followed by examples of the operation of those systems. The following examples are non-limiting.

Figure 1:
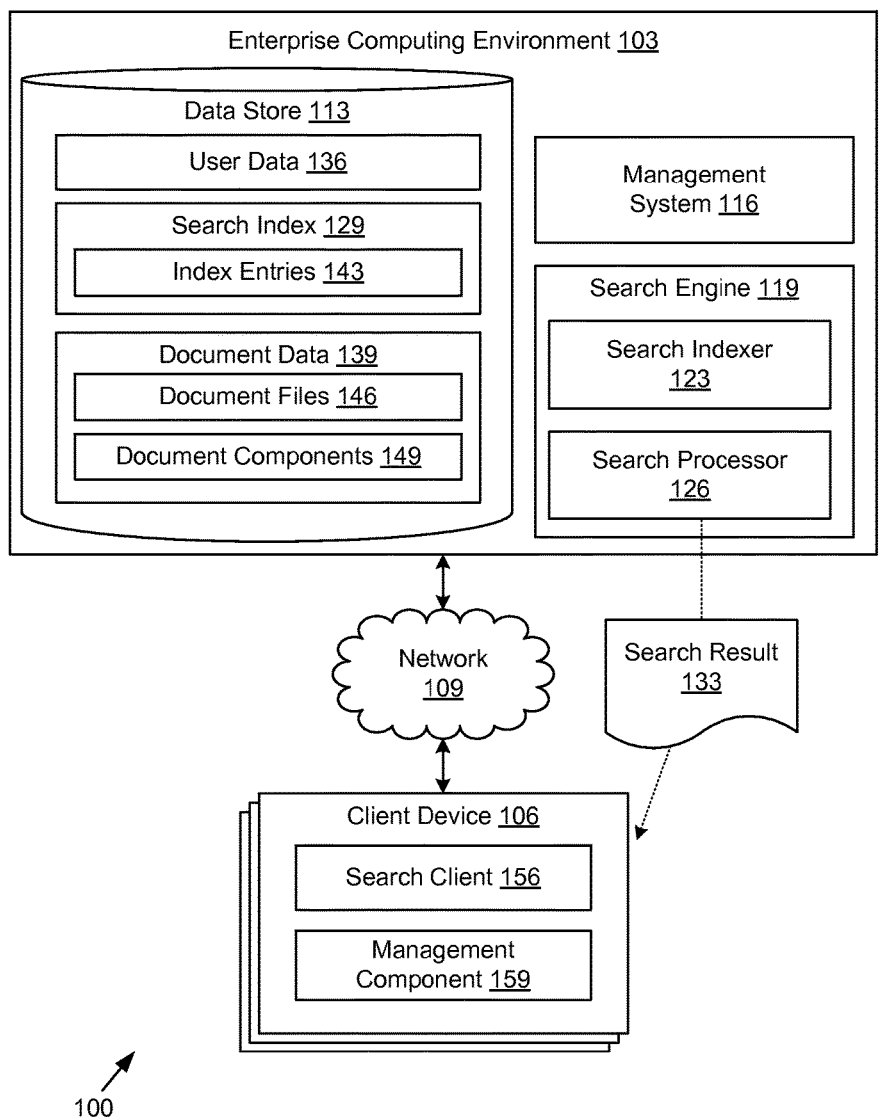
FIG. 1 is a drawing of an example of a networked environment.

With reference to FIG. 1, shown is an example of a networked environment 100. The networked environment 100 includes an enterprise computing environment 103 and a client device 106, which are in data communication through a network 109. The network 109 includes the Internet, one or more intranets, extranets, wide area networks (WANs), local area networks (LANs), wired networks, wireless networks, or any combination of two or more such networks. The network 109 in various examples comprises satellite networks, cable networks, Ethernet networks, and telephony networks.

The enterprise computing environment 103 is a computing environment that is operated by an enterprise, such as a business or other organization. The enterprise computing environment 103 comprises a computing device, such as a server computer, that provides computing capabilities. Alternatively, the enterprise computing environment 103 employs multiple computing devices arranged in one or more server banks or computer banks. Such computing devices in one example are located in a single installation. In another example, the computing devices for the enterprise computing environment 103 are distributed among multiple different geographical locations. In one example, the enterprise computing environment 103 includes multiple computing devices that together form a hosted computing resource or a grid computing resource. Additionally, the enterprise computing environment 103 in some examples operates as an elastic computing resource where the allotted capacity of computing-related resources, such as processing resources, network resources, and storage resources, vary over time. In other examples, the enterprise computing environment 103 includes or is operated as one or more virtualized computer instances that are executed in order to perform the functionality that is described herein.

Various systems are executed in the enterprise computing environment 103, and various data is stored in a data store 113 that is accessible to the enterprise computing environment 103. For example, a management system 116 is executed in the enterprise computing environment 103 to monitor and manage the operation of multiple client devices 106 that are associated with the enterprise that provides the enterprise computing environment 103. In particular, the management system 116 is executed to manage and oversee the operation of multiple client devices 106 that are enrolled in a device management service that is facilitated by the management system 116. In one example, an employer operates the management system 116 to ensure that the client devices 106 of its employees are operating in compliance with various compliance rules. By ensuring that the client devices 106 of its employees are operating in compliance with the compliance rules, the employer controls and restricts access to resources associated with the employer as well as the users of the client devices 106. The management system 116 also facilitates access to email, calendar data, contact information, and other enterprise resources associated with the enterprise.

In addition, a search engine 119 executes in the enterprise computing environment 103. The search engine 119 includes a search indexer 123 and a search processor 126. The search indexer 123 generates and maintains a search index 129, which is described in further detail below. The search processor 126 obtains search queries from client devices 106 and generates search results 133 that are provided to the client device 106, as will be described in further detail below as well.

The data store 113 shown in FIG. 1 is representative of multiple data stores 113 that are accessible to components of the enterprise computing environment 103. The data stored in the data store 113 includes user data 136, the search index 129, and document data 139.

The user data 136 includes data that is associated with the users of the client devices 106. Such user data 136 includes, for example, information that identifies the user, information that specifies the user's job or other role in the enterprise, and calendar data for the user. Such calendar data in some examples includes tasks that the user is scheduled to perform at a particular time or date. Thus, as one example, the user data 136 for a particular user indicates that a user is a pilot employed by the enterprise and that the user is scheduled to fly a particular type of aircraft on a particular date.

The search index 129 is generated and maintained by the search indexer 123. The search index 129 includes index entries 143, which comprise data regarding terms that have been identified in documents. In some examples, each index entry 143 corresponds to a particular term, and each index entry 143 specifies the documents where that particular term appears. In addition, an index entry 143 in some examples includes location data that specifies the locations within the documents where the particular term appears, such as a page number, header, footer, table, column number, or other location indicia that can be extracted from the layout. Furthermore, in some examples, an index entry 143 includes contextual boundary data, which defines a segment of content in the document that provides context for a user regarding the corresponding term. Accordingly, as one example, the index entry 143 for the term "telephone" includes data that identifies documents in which the term "telephone" appears, the locations within those documents where the term "telephone" appears, and contextual boundary data that specifies content that provides context regarding how the term "telephone" is used in those instances. In one such example, the contextual boundary data for an instance of the term "telephone" specifies that the paragraph that immediately precedes the term "telephone" and the paragraph that immediately follows the term "telephone" are within the defined contextual boundary.

The document data 139 includes information regarding electronic documents that are associated with the enterprise computing environment 103. For example, the document data 139 includes document files 146 and document components 149. A document file 146 includes data for a particular electronic document. A document file 146 in various examples is authored and saved in accordance with various open or proprietary document file formats, such as the MICROSOFT WORD document format, portable document format (PDF), or MICROSOFT EXCEL document format.

The document components 149 include data representing components that have been extracted from a document file 146. For example, the document components 149 include a document structure and a document layout. A document structure describes the logical structure of the content for a document file 146. The document structure in various examples includes the text of the document as well as information describing how the text of the document is segmented into paragraphs or other indicia of structure. In addition, the document structure in some examples includes graphical elements, such as images, charts, and other media content of a document.

A document layout describes, for example, a visual layout of a document. In other words, a document layout describes how content of a document is presented or laid out when printed or rendered in a user interface. The document layout in some examples includes information, such as fonts used in the document and the location of text and images on particular pages of the document. Thus, the document layout specifies how the various textual components, graphical elements, and other media represented in the document structure are displayed when the document is printed or rendered in a user interface.

The client device 106 is representative of multiple client devices 106 that are coupled to the network 109. The client device 106 comprises, for example, a processor-based computer system. According to various examples, the client device 106 is embodied in the form of a desktop computer, a laptop computer, a personal digital assistant, a mobile phone, a web pad, or a tablet computer system. The client device 106 includes output devices, such as a display and audio speakers, as well as one or more input devices, such as a mouse, keyboard, touch pad, or touch screen, which facilitate a user interacting with the client device 106.

The client device 106 is configured to execute a search client 156 and a management component 159. The search client 156 includes, for example, an application that a user operates in order to perform search queries across one or more documents. The search client 156 generates user interfaces that facilitate a user inputting search criteria as well as viewing the results of the search queries. In one example, the search client 156 is embodied in the form of a web browser that renders network pages and other network content served by the enterprise computing environment 103.

In other examples, the search client 156 is embodied in the form of a containerized content application that is capable of obtaining and rendering documents associated with the enterprise computing environment 103. The containerized content application facilitates an authorized user of the client device 106 accessing documents and other resources that are stored in the data store 113 of the enterprise computing environment 103 by retrieving the resources from the enterprise computing environment 103 and presenting the resources in a user interface. The containerized content application also communicates with the management system 116 so that various functionality of the containerized content application can be enabled or disabled according to specified security policies. For example, an administrator may specify a security policy that the management system 116 and containerized content application implement to restrict a user's ability to open, edit, print, or share documents using the containerized content application. In addition, the containerized content application facilitates a user of the client device 106 storing documents and other resources in the data store 113 of the enterprise computing environment 103. To this end, the containerized content application transmits the resource to the enterprise computing environment 103 in response to the resource been created, saved, or modified by the containerized content application.

The client device 106 executes the management component 159 to monitor and manage data, software components, and hardware components. The management component 159 also identifies whether the client device 106 is operating in accordance with one or more compliance rules that are associated with the client device 106. In one example, the management component 159 functions as a device management service that operates as a portion of an operating system for the client device 106. In another example, the management component 159 functions as a device management agent that operates in the application layer of the client device 106. In one example in which the management component 159 operates in the application layer of the client device 106, the management component 159 operates as a dedicated application that monitors and manages data, software components, and hardware components. In another example in which the management component 159 operates in the application layer of the client device 106, the enterprise computing environment 103 obtains and decompiles an application, and then inserts code from security libraries into the decompiled binary code. When the application is later compiled with the security library code and then installed on the client device 106, a management agent on the client device 106 monitors and manages the application through the access that is gained by virtue of the security library code. In alternative examples, the enterprise provides a software development kit (SDK) that facilitates developers of applications integrating security libraries with an application that can be distributed and installed on the client device 106.

The management component 159 communicates with the management system 116 in order to facilitate the management system's 116 monitoring and managing of the client device 106. The management component 159 in some examples obtains compliance rules from the management system 116, and the management component 159 determines and reports back to the management system 116 whether the client device 106 is operating in compliance with the compliance rules. In an alternative approach, the management component 159 transmits data that indicates the status of properties and settings for the client device 106, and the management system 116 uses this data to determine whether the client device 106 is operating in compliance with the compliance rules. If the client device 106 is not in compliance with one or more compliance rules, the management component 159 or the management system 116 causes a remedial action to be performed. Examples of remedial actions include notifying a user of the client device 106 or an administrator of the management system 116, causing device settings to be changed so that the client device 106 becomes compliant with the compliance rules, and erasing data from storage in the client device 106.

Next, examples of the operation of the networked environment 100 and its various components are described. To begin, the search indexer 123 obtains a copy of a document file 146 that is to be indexed. In one example, a document file 146 is indexed automatically upon being stored in the data store 113 or in a client device 106. In another example, users of client devices 106 or administrators of the enterprise computing environment submit requests for the search indexer 123 to index particular document files 146. Furthermore, in another approach, the search indexer 123 "crawls" network sites and network pages, such as web sites and web pages, to obtain document files 146 for indexing.

Once the search indexer 123 has obtained a document file 146 for indexing, the search indexer 123 begins the process of extracting document components 149, such as the document structure and document layout, from the document file 146. As described above, the document structure defines the logical structure of content of the document, and the document layout defines a visual layout of the content of the document. For instance, the document structure may include text; information describing how the text is segmented into sentences, paragraphs, sections, or other indicia of structure; and graphical elements, such as images and charts. The document layout describes how the text and graphical elements are arranged, positioned, and styled in the document when the document is rendered by printing or presenting the document in a user interface. For instance, the document layout in one example describes the particular pages and locations where content is located on a rendered document, as well as the fonts and other stylization being used for text or other elements.

After the search indexer 123 has extracted the document components 149, such as the document structure and the document layout, the search indexer 123 identifies terms, such as words or phrases, in the document structure that are to be indexed. In one approach, the search indexer 123 generates a list of all of the terms that appear in the document structure and then removes any of the terms that are to be excluded from the search index 129. In one such example, the search indexer 123 excludes particular categories of words that are unlikely to be keywords, such as articles, prepositions, pronouns, adjectives, and adverbs, so that the amount of index entries 143 in the search index 129 does not become overly burdensome for processing by the search processor 126.

For each term that is identified in the document structure, the search indexer 123 populates index data in a corresponding index entry 143. In this regard, the search indexer 123 either adds index data to a pre-existing index entry 143 for a term, or, if a corresponding index entry 143 does not already exist in the search index 129, creates a new index entry 143 and includes index data in the newly created index entry 143.

The index entries 143 are populated with various types of information. In some examples, an index entry 143 for a term is populated with information that identifies the document file 146 in which the term appears. Additionally, an index entry 143 in some examples includes information that identifies the one or more locations within the document structure where the term appears. Accordingly, in these examples, an index entry 143 for the term "manifold" would include information that identifies the particular document files 146 in which the term "manifold" appears as well as the particular locations within the corresponding document structures where the term "manifold" appears. In various examples, the information that identifies the locations within the document structure specifies a particular page, paragraph, and word location for the corresponding term.

Furthermore, the search indexer 123, in some examples, populates each index entry 143 with information that defines a contextual boundary for the corresponding term. Such a contextual boundary specifies a portion of the document's content that is proximate to the term and that provides context to a user regarding the term's usage in the document. In one approach, the search indexer 123 specifies that the contextual boundary is defined by the beginning and end of the sentence, paragraph, or other structural segment of content in which the term appears. To specify such a contextual boundary, the search indexer 123 uses the extracted document structure to identify the beginning and end of the structural segment in which the term is located.

In some examples, a respective search index 129 is generated and populated for each user of a client device 106. In these examples, each user can define a contextual boundary preference that is used to determine the contextual boundaries for indexed terms. In one example, a user specifies the contextual boundary preference so that the contextual boundary for a term will include the paragraph that precedes and the paragraph that follows the term being indexed. In another example, a user specifies the contextual boundary preference so that the contextual boundary for a term will include the sentence that precedes and the sentence that follows the term being indexed.

In another approach, the search indexer 123 applies natural language processing to the document structure and performs a relevancy analysis on the content that surrounds a term. By performing the relevancy analysis, the search indexer 123 determines whether content that precedes and follows the term is relevant to the term. Based on the results of the relevancy analysis, the search indexer 123 specifies the beginning and the end of the contextual boundary. In one example in which the contextual boundary is determined based on relevancy analysis, the contextual boundary includes the paragraph in which the term is located as well as a portion of the preceding paragraph and a portion of the following paragraph.

In some examples, the search indexer 123 also uses the document layout to identify content, including text and graphical elements, that are within a particular distance from the term being indexed. As one example, the search indexer 123 defines the contextual boundary to include any text or graphical elements that are within N units of measurement above the term and within M units of measurement below the term, wherein N and M are predefined number. In this way, text and graphical elements that are near the term being indexed are included within the contextual boundary. In another approach, the search indexer 123 performs image processing techniques to recognize objects that are depicted in graphical elements in a document and to determine whether to define the contextual boundary so that particular graphical elements are included within the contextual boundary. For instance, if the search indexer 123 is indexing the term "dog" and detects that a dog is depicted in a graphical element, the search indexer 123 determines to define the contextual boundary so the graphical element is included within the contextual boundary.

The search indexer 123 performs the process of indexing terms in document files 146, as described above, for multiple documents. As a result, the search index 129 includes index entries 143 for multiple document files 146, and the search processor 126 can search across multiple documents when a client device 106 provides a search query.

After document files 146 have been indexed by the search indexer 123, a user of a client device 106 can operate the search client 156 to perform a search query. In some examples, the user inputs a search term, including one or more words or phrases, using a user interface for the search client 156, and the search client 156 transmits the search term to the search processor 126. For example, the search terms "de-icing" or "de-icing airplanes" can be input by a user and transmitted to the search processor 126.

Once the search processor 126 obtains the search term from the client device 106, the search processor 126 proceeds with the process of generating search results 133 based on the search term. In one example, the search processor 126 retrieves the index data for the index entries 143 that correspond to the search term that was provided by the search client 156. For example, if the search term includes multiple words, the corresponding index entry 143 for each word is retrieved by the search processor 126.

In another example, the search processor 126 processes the search term to remove phrases or words, such as articles, prepositions, pronouns, adjectives, and adverbs, from the search term, so that resulting search of the search index 129 is not overly burdensome for the search processor 126. As an example, if the search term submitted by the client device 106 includes the phrase "when to de-ice," the search processor 126 removes the words "when" and "to" from the search term.

Furthermore, in some examples, the search processor 126 identifies related words or phrases for the search term, and then modifies the search term so that the data for the index entries 143 for those identified synonyms will be retrieved. As an example, if the search term submitted by the client device 106 includes the word "de-icing," the search processor 126 appends the phrase "removal of ice" to the search term to retrieve the index entries 143 corresponding to the terms "de-icing" and "removal of ice."

In one approach, the search processor modifies the search term based on the user data 136 that corresponds to the user that submitted the search term. As described above, the user data 136 includes data that specifies the user's role in the enterprise that provides the enterprise computing environment 103. For instance, the user data 136 in some examples specifies the user's job title or includes calendar data that specifies a task that the user is to perform at a particular date and time. Using this user data 136, the search processor 126 modifies the search term that was received from the client device 106. For example, if a user submitted the search term "de-icing," and the user data 136 indicates that the user is a pilot, the search processor 126 modifies the search term to include words or phrases that are related to the user's role in the enterprise as a pilot. Accordingly, the search term in one such example would be modified to include the words "de-icing," "pilot," and "aircraft." By contrast, if a user submitted the search term "de-icing," and the user data 136 indicates that the user is an attorney for the enterprise, the search processor 126 in one example would modify the search term to include the words "de-icing," "lawsuit," and "slip-and-fall." In this way, the search processor 126 generates search results 133 based on the user's role in the enterprise that provides the enterprise computing environment 103.

In other examples, if a user submitted the search term "de-icing," and the user data 136 includes calendar data that indicates that the user is a pilot scheduled to fly a particular type of aircraft near the time when the search term was submitted, the search processor 126 modifies the search term to include words or phrases that are related to the user's role as a pilot and the particular type of aircraft that the user is scheduled to fly. For example, if a pilot submitted the search term of "de-icing" thirty minutes before the time when the pilot's calendar data indicated the pilot was scheduled to fly a particular type of aircraft, the search term would be modified to include the words "de-icing," "pilot," and the identity of the aircraft that the user is scheduled to fly. Although an example of accessing calendar data has been provided, data regarding a user's role and job responsibilities may also be obtained from other databases, such as enterprise databases.

As mentioned above, the search processor 126 retrieves the data for the index entries 143 that correspond to the words and phrases included in the search term. The retrieved data for each index entry 143 in some examples includes information that identifies the particular document files 146 that include the corresponding term, the locations within the corresponding document structures where the term appears, and information that defines the corresponding contextual boundaries for the term.

Using this retrieved data, the search processor 126 generates and encodes one or more search results 133 that are provided to the client device 106. In one approach, each search result 133 includes all of the content from the document structure that is located within the contextual boundary for the corresponding term. Thus, if the contextual boundary for a term is the paragraph in which the term is located, the search result 133 includes all of the content within that paragraph. If the contextual boundary for a term includes the paragraph in which the term is located as well as a graphical element in the document, the search result 133 includes the paragraph and that graphical element.

In some examples, the user of the client device 106 submits contextual boundary preference data that specifies a default amount of contextual content that the search processor 126 should provide in a search result 133. In one example, the contextual boundary preference data is specified as a setting that the user can configured from time to time. In another example, the contextual boundary preference data is submitted together with the search term. For instance, a user can submit a search term together with contextual boundary preference data specifying that, for each returned search result 133, the corresponding contextual content should include N paragraphs of text, where N is a number selected by the user.

The search processor 126 also encodes each search result 133 for rendering by the client device 106. In one approach, the search processor 126 uses the document components 149, such as the document structure and the document layout that were extracted by the search indexer 123, to generate a hypertext markup language (HTML) representation of the document by including HTML elements that facilitate the rendering of content by the search client 156. In some examples, the HTML elements include HTML5 canvas elements along with accompanying client-side code that is interpreted and executed by the search client 156. The client-side code directs how the search client 156 should render content within a user interface of the client device 106. Such client-side code includes scripting code, such as JAVASCRIPT code, that is specified under the HTML5 canvas element standard for rendering text and two-dimensional graphics content of the portion of the document included within the contextual boundary for the index entry 143.

A second approach of encoding a search result 133 involves generating one or more images of a document file 146 based on the document components 149, such as the document structure and the document layout, and then transmitting the generated images to the search client 156 for rendering. The search processor 126 creates, for example, a representation of a portion of the document that includes images, or "screenshots," that represent the portion of the document to be included as a search result 133. In one example, the search processor 126 encodes the search result 133 by generating client-side code that references one or more images corresponding to contextual boundary for the index entry 143.

A third approach of encoding a search result 133 involves transmitting the document components 149, such as the document structure and document layout, along with client-side code that instructs the search client 156 how to render the document components 149. In this approach, the search client 156 receives the document components 149, and then renders the document components 149 as specified by the received instructions.

A fourth approach of encoding a search result 133 involves generating an extensible markup language (XML) document object model (DOM) that represents the portion of the corresponding document file 146 that is within the specified contextual boundary. In this approach, the XML DOM describes the layout and content of the portion of the document file 146 within the specified contextual boundary, and the search client 156 renders the specified data.

Thus, in various approaches, a search result 133 includes an encoded representation of the portion of the document files 146 that is within the specified contextual boundary. The encoded representation in some examples includes client-side code, such as scripting code, that is executed by the search client 156.

Typically, each search query from a user results in multiple search results 133 being generated, encoded, and then transmitted to the search client 156. When the search client 156 receives the search results 133, the received search results 133 are rendered for presentation to the user of the client device 106. In one example, all of the search results 133 are rendered using the same styling, such as the same font size and style. In this way, all of the rendered search results 133 have the same "look and feel." In other examples, each search result 133 is rendered using the same styling that is used in the document file 146 on which the search result 133 is based. In other words, when the search result 133 is rendered, the rendering appears to be a snippet of the corresponding document file 146. Presenting a search result 133 so that it appears to be a snippet of the corresponding document file 146 facilitates a user recognizing the rendered content and thus identifying a search results 133.

In some examples, the search client 156 or the search processor 126 use a translator that translates the text represented in the search results 133 from one language to another language. In one example, the user of the client device 106 specifies a language setting that determines the language in which text for a search result 133 is presented to the user. In another example, the search client 156 or the search processor 126 determines the location of the client device 106 and translates the text into a language that corresponds to the location of the client device 106. The search processor 127 or the search client 156 then translates text in a search result 133 based on the language setting or the location of the client device 106. For instance, if search result 133 includes text that is in English, and if the client device 106 is located in Germany, the search client 156 or the search processor 126 translate the text represented in the search result 133 to German. Additionally, the text of the search results 133 in some examples is rendered using the same styling, such as the same font size and style, as used on the corresponding document file 146 on which the search result 133 is based. In this way, when the search result 133 is rendered, the rendering appears to be a translated snippet of the corresponding document file 146.

In some examples, the search processor 126 filters or modifies the ordering of search results 133 prior to transmitting the search results 133 to the search client 156. In these examples, the search processor 126 uses the user data 136, such as calendar data or data that indicates the user's role in the enterprise, to modify the ordering of the search results 133. For example, if the user data 136 for a particular user indicates that the user is a pilot that is scheduled to fly a particular type of aircraft, the search results 133 that are most relevant to the user's role as a pilot that is schedule to fly the particular type of aircraft are given a higher ranking or priority relative to other search results.

In addition, the search client 156 in some examples facilitates a user specifying a search result 133 as being a preferred search result 133. For example, a user may "favorite" a search result 133 by selecting a user interface element to indicate that the user wishes to have the search result 133 presented in subsequent searches. If a user identifies a search result 133 as being a preferred search result 133, the search processor 126 takes this information into account when processing subsequent search terms. For example, if a preferred search result 133 is generated when processing a subsequent search term, the search process 126 assigns the preferred search result 133 a relatively high ranking or priority for presentation in a user interface.

Additionally, the search client 156 in some examples facilitates a user removing a rendered search result 133 from a user interface. For example, if a user considers a search result 133 to be irrelevant to a particular search term, the user can interact with a user interface element to cause the rendered search result 133 to be removed from the user interface. In one example, if the search client 156 detects that the user made a swipe gesture relative to a rendered search result 133, the search client 156 removes the rendered search result 133 from the user interface. In addition, the search processor 126 takes this information into account when processing subsequent search terms. For example, if a search result 133 is generated when processing a subsequent search term, and if the user previously removed that search result 133 from a user interface, the search processor 126 assigns that search result 133 a relatively low ranking or priority for presentation in a user interface.

Figure 2A:

With reference to FIG. 2A, shown is an example of a user interface 200a generated by the search client 156 and rendered by the client device 106. In particular, the user interface 200a includes renderings of search results 133a-133c that were generated and encoded by the search processor 126 in response to a search term that was transmitted by the search client 156.

For the example illustrated in FIG. 2A, a user operating the client device 106 has used the search client 156 to submit the search term of "de-icing" to the search processor 126. In response, the search processor 126 modified the search term based on the user's role in the enterprise. More specifically, for the example illustrated in FIG. 2A, the user data 136 for the user indicates that the user is a pilot that is scheduled to fly a particular type of aircraft soon after the search term was submitted. As such, the search processor modified the submitted search term to include words and phrases that correspond to the user's role in the enterprise. In addition, the search processor 126 has selected the order of presentation of the search results 133a-133c based on the user's role in the enterprise.

As shown in FIG. 2A, the user interface 200a includes renderings of the search results 133a-133c that were generated and provided by the search processor 126. In some examples, the user of the client device 106 can specify the default number of search results 133 that are presented in the user interface 200a. For the example shown in FIG. 2A, the user has specified that, initially, the user interface 200a should include three search results 133 in the user interface 200a.

In the example shown in FIG. 2A, the search processor 126 has determined that the search result 133a is more relevant than the search results 133b-133c based on the user's role in the enterprise. Accordingly, the search result 133a shown in FIG. 2A is positioned above the search results 133b-133c when rendered in the user interface 200a. Additionally, for the example that is illustrated in FIG. 2A, the search results 133a-133c have been encoded by the search processor 126 and rendered by the search client 156 so that styling, such as the font and relative text sizes, of the rendered search results 133a-133c appears identical to the style of the content when the corresponding document files 146 are printed or rendered. As such, the search results 133a-133c appear to be snippets of renderings of the corresponding document files 146. Presenting the search results 133a-133c so that they appear to be snippets of the corresponding document files 146 facilitates the user recognizing the rendered content.

The user interface 200a also includes increase context buttons 203a-203c and decrease context buttons 206a-206c that correspond to the rendered search results 133a-133c, respectively. The increase context buttons 203a-203c and decrease context buttons 206a-206c are selectable by a user by manipulating an input device, such as a pointer device or a touch screen, for the client device 106.

When a user selects one of the increase context buttons 203a-203c, the search client 156 transmits a request for the search processor 126 to generate and encode an updated search result 133a-133c that includes additional information from the corresponding document file 146. For example, if the user selects the increase context button 203a, the search processor 126 generates an updated search result 133a that includes additional content from the corresponding document file 146. In one example, the additional content that is included in the search result 133a includes one or more sentences that precede and one or more sentences that follow the content that was previously included in the previous version of the search result 133a. In another example, the additional content that is included in the updated search result 133a includes one or more paragraphs that precede and one or more paragraphs that follow the content that was previously included in the previous version of the search result 133a. Once the search client 156 obtains the updated search result 133a, the updated search result 133a is rendered in the user interface 200 using one or more of the approaches described above. Thus, when a user selects the increase context button 203a, the user is provided additional content from a portion of the corresponding document file 146. Because presenting additional or less content from a portion of the corresponding document file 146 typically changes the amount of space that a rendered search result 133 occupies within the user interface 200a, the search client 156 adjusts the quantity of search results 133 that are presented in the user interface 200a in response to an updated search result 133 being received. For example, if the search client 156 receives an updated version of the search result 133a that includes additional content, the search client 156 removes the search result 133c to provide space to display an updated version of the search result 133a. By contrast, if the search client 156 receives an updated search result 133a that includes less content, the search client 156 requests an additional search result 133 and renders that additional search result 133 in the user interface 200a.

When a user selects one of the decrease context buttons 206a-206c, the search client 156 transmits a request for the search processor 126 to generate and encode an updated search result 133a-133c that includes less information from the corresponding document file 146. For example, if the user selects the decrease context button 206a, the search processor 126 generates an updated search result 133a that includes less content from the corresponding document file 146. In one example, the additional content that is included in the search result 133a omits one or more sentences, or one or more paragraphs, that were previously included in the previous version of the search result 133a. Thus, when a user selects the decrease context button 206a, the rendered search result 133a provides less content from a portion of the corresponding document file 146.

In alternative examples, the search client 126 requests the search processor 126 to generate and encode updated search results 133a-133c responsive to detected user gestures. For example, if the search client 126 detects that the user performed an input gesture using an input device, such as a touch pad or touch screen, the search client 126 requests updated search results 133a-133c that include additional or less contextual content. In one approach, the search client 126 detects that the user performed a tap gesture in which a finger was pressed against a touch pad or touch screen for a particular time duration. In response to the detected tap gesture, the search client 126 requests an updated search result 133 having an amount of contextual content that corresponds to the amount of time for which the finger was pressed against the touch pad or touch screen. For instance, if the user presses a finger against the touch pad or touch screen for one second, the search client 126 requests an updated search result 133 having one paragraph of contextual content in which the search index 129 term is located. If the user presses a finger against the touch pad or touch screen for three seconds, the search client 126 requests an updated search result 133 having three paragraphs of contextual content, including the paragraph that precedes and the paragraph that follows the paragraph in which the search index 129 term is located.

In another example, the search client 126 detects that the user performed a pinch or swipe gesture using an input device. In response to detecting the pinch or swipe gesture, the search client 126 requests an updated search result 133 that includes additional or less contextual content. In one approach, the search client 126 detects that the user performed a pinch or swipe gesture in which a finger moved by a particular distance. In response to the detected pinch or swipe gesture, the search client 126 requests an updated search result 133 having an amount of contextual content that corresponds to the distance that the finger moved. For instance, if the finger moves one inch, the search client 126 requests an updated search result 133 that includes only the paragraph of content in which the search index 129 term is located. If the user's finger moves three inches, the search client 126 requests an updated search result 133 that includes three paragraphs of content, including the paragraph that precedes and the paragraph that follows the paragraph in which the search index 129 term is located.

In some examples, instead of the search client 126 requesting updated search result 133a-133c, the content to be rendered by a display when a user selects the context buttons 203a-303c or 206a-206c is provided to the search client 126 together with a search result 133. The corresponding results can be saved temporarily at the enterprise computing environment 103, or provided to the client device 106 with the search results 133a-133c. In this manner, selecting context buttons 206a-206c provides immediate results to the display without needing to execute an updated search. The process of pre-storing results corresponding to buttons 203a-203c or 206a-206b can be performed for a defined number of the top results, such as the top three results, and a defined number of selections, such as two selections of buttons 203a-203c or 206a-206c.

With reference to FIG. 2B, shown is an example of a user interface 200b generated by the search client 156 and rendered by the client device 106. In particular, the user interface 200b includes renderings of search results 133d-133f that were generated and encoded by the search processor 126 in response to a search term that was transmitted by the search client 156.

For the example illustrated in FIG. 2B, a user operating the client device 106 has used the search client 156 to submit the search term of "de-icing" to the search processor 126. In response, the search processor 126 modified the search term based on the user's role in the enterprise. More specifically, for the example illustrated in FIG. 2B, the user data 136 for the user indicates that the user is an aircraft mechanic that is scheduled to work on a particular type of aircraft soon after the search term was submitted. As such, the search processor modified the submitted search term to include words and phrases that correspond to the user's role in the enterprise. In addition, the search processor 126 has selected the order of presentation of the search results 133d-133f based on the user's role in the enterprise.

As shown in FIG. 2B, the user interface 200b includes renderings of the search results 133a-133c that were generated and provided by the search processor 126. In the example, shown, the search processor 126 has determined that the search result 133d is more relevant than the search results 133e-133f based on the user's role in the enterprise. Accordingly, the search result 133d shown in FIG. 2B is positioned above the search results 133e-133f when rendered in the user interface 200b. Additionally, the search results 133d-133f have been encoded by the search processor 126 and rendered by the search client 156 so that styling, such as the font and relative text sizes, of the rendered search results 133d-133f appears identical to the style of the content when the corresponding document files 146 are printed or rendered. As such, the search results 133d-133f appear to be snippets of renderings of the corresponding document files 146.

Figure 3:
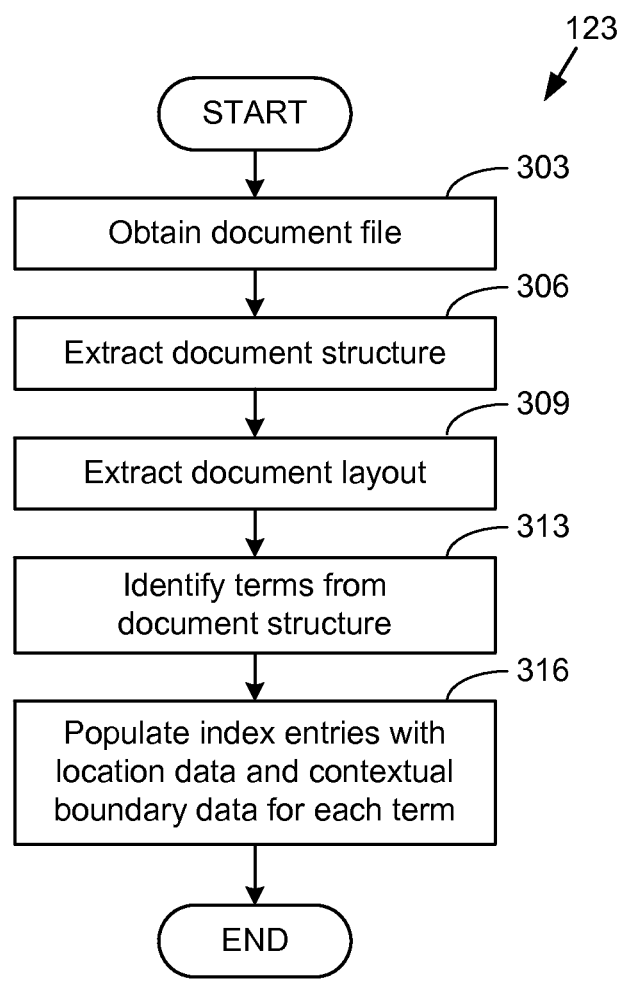
FIG. 3 is a flowchart illustrating an example of functionality implemented by a search indexer in an enterprise computing environment.

With reference to FIG. 3, shown is a flowchart that provides an example of a portion of the operation of the search indexer 123. In particular, FIG. 3 provides an example of the search indexer 123 indexing the content of a document file 146. It is understood that the flowchart of FIG. 3 provides merely an example of the many different types of functional arrangements that may be performed to implement the operation the search indexer 123 as described herein. Additionally, the flowchart of FIG. 3 may be viewed as depicting an example of steps of a method implemented in the enterprise computing environment 103.

Beginning at step 303, the search indexer 123 obtains a document file 146. In one example, the document file 146 is obtained upon the document file 146 being stored in the data store 113. In this way, all of the document files 146 in the data store 113 are indexed for searching upon being stored in the data store 113. In another example, a document file 146 is obtained by the search indexer 123 in response to an administrator of the enterprise computing environment 103 or a user of the client device 106 requesting that the document file 146 to be indexed. For instance, an administrator of the enterprise can submit a request for all of the document files 146 in the data store 113 to be indexed.

At step 306, the search indexer 123 extracts the document structure from the document file 146. As described above, a document structure describes the logical structure of the content for a document file 146. The document structure in various examples includes the text of the document as well as information describing how the text of the document is segmented into paragraphs or other indicia of structure. In addition, the document structure in some examples includes graphical elements, such as images, charts, and other media content of a document.

Next, the search indexer 123 extracts the document layout from the document file 146, as shown at step 309. The extracted document layout describes, for example, a visual layout of a document. The document layout in some examples includes information, such as fonts used in the document and the location of text and images on particular pages of the document.

The search indexer 123 then moves to step 313 and identifies terms from the extracted document structure that are to be indexed. In some examples, the terms that are identified can be regarded as being keywords. In one approach, the search indexer 123 filters the text in the document structure to remove articles, prepositions, pronouns, adjectives, and adverbs, so that the amount of index entries 143 in the search index 129 does not become overly burdensome for processing by search indexer 123 and the search processor 126.

As shown at step 316, the search indexer 123 then populates index entries 143 with location data and contextual boundary data for each term that was identified at step 313. In this regard, the search indexer 123 either adds index data to a pre-existing index entry 143 for a term, or, if a corresponding index entry 143 does not already exist in the search index 129, creates a new index entry 143 and includes index data in the newly created index entry 143. In some examples, the location data for an index entry 143 includes information that identifies the document file 146 in which the term appears as well as information that identifies the one or more locations within the document structure where the term appears. The contextual boundary data for an index entry 143 specifies a portion of the document's content that is proximate to the term and that provides context to a user regarding the term's usage in the document. In one approach, the search indexer 123 specifies that the contextual boundary is defined by the beginning and end of the sentence, paragraph, or other structural segment of content in which the term appears. To specify such a contextual boundary, the search indexer 123 uses the extracted document structure to identify the beginning and end of the structural segment in which the term is located. Following step 316, the process ends.

Figure 4:
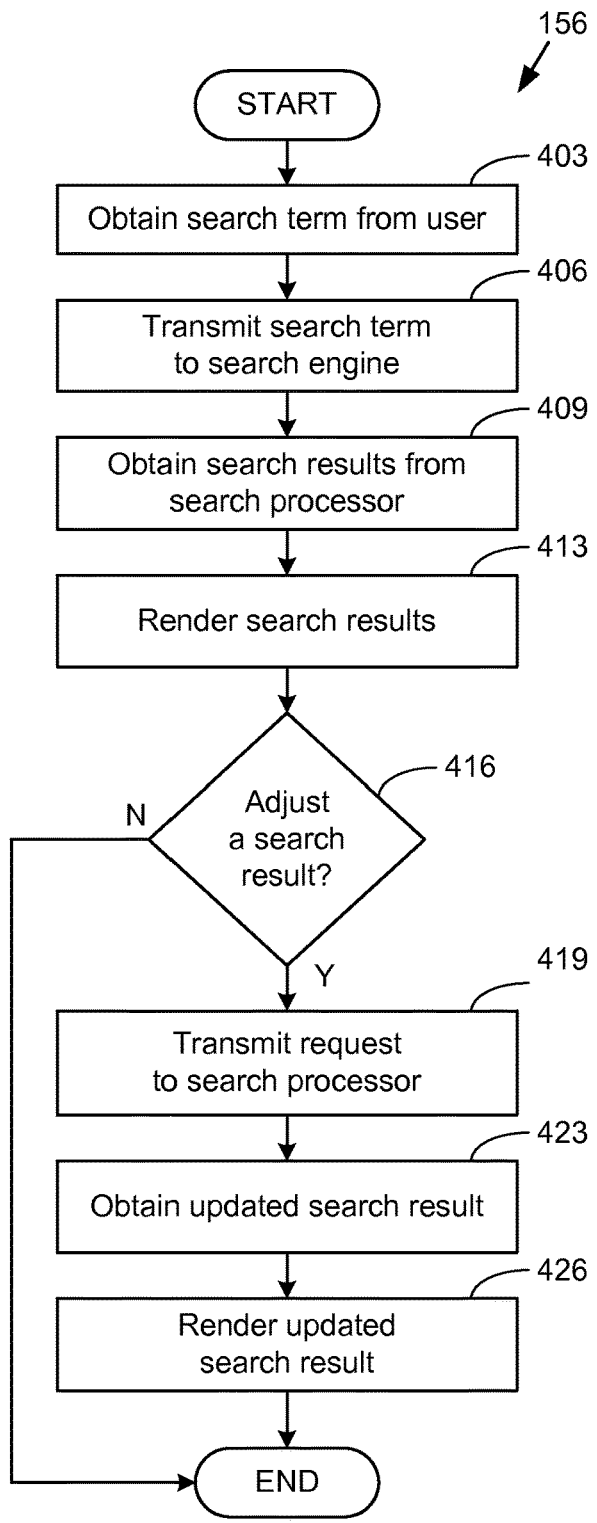
FIG. 4 is a flowchart illustrating an example of functionality implemented by a search client in a client device.

With reference to FIG. 4, shown is a flowchart that provides an example of a portion of the operation of the search client 156. In particular, FIG. 4 provides an example of the search client 156 submitting a search term to the search processor 126, obtaining search results 133, and then rendering the search results 133. It is understood that the flowchart of FIG. 4 provides merely an example of the many different types of functional arrangements that may be performed to implement the operation the search client 156 as described herein. Additionally, the flowchart of FIG. 4 may be viewed as depicting an example of steps of a method implemented in the client device 106.

Beginning at step 403, the search client 156 obtains a search term from the user. In one example, the search client 156 obtains the search term by generating a user interface that facilitates the user inputting text that includes the search term. Next, at step 406, the search client 156 transmits the search term to the search processor 126.

Thereafter, as shown at step 409, the search client 156 obtains the search results 133 that were transmitted by the search processor 126. In some approaches, each search result 133 includes an encoded representation of the portion of a document file 146 that is within a specified contextual boundary. The encoded representation in some examples includes client-side code, such as scripting code, that is executable by the search client 156. At step 413, the search client 156 renders the search results 133 that were obtained.

The search client 156 then moves to step 416 and determines whether the search client 156 received a request to adjust a search result 133. Such a request in one example includes a user selecting one of the increase context buttons 203a-203c or decrease context buttons 206a-206c shown in FIG. 2. If a request was not received, the process moves to step 429. Otherwise, if a request to adjust a search result has been received, the search client 156 moves to step 419 and transmits a request to the search processor 126 for an updated search result 133. In some examples, such a request includes a request to provide additional content or less content for the search result 133. The adjusted search results providing more or less content can also be automatically provided to the client device 106 with search results 133, allowing quick display on a user interface without sending an additional request to the search processor 126 at step 419.

After the request for the updated search result 133 has been transmitted, the search client 156 obtains the updated search result 133, as shown at step 423. The search client 156 then moves to step 426 and renders the updated search result 133. Thereafter, the search client 156 moves to step 429 and determines whether the search client 156 received a request to remove a search result 133. The a request in some examples includes a user swiping a region of a touch screen or pressing a region of a touch screen. If a request to remove a search result 133 was not received, the process ends. Otherwise, if the search client 156 did receive a request to remove a search result 133, the search client 156 moves to element 433, and the search result 133 is removed. In some examples, an additional search result 133 is retrieved and rendered in the space that has been made available by the search result 133 being removed. In other examples, the renderings of other search results 133 are enlarged or moved in position to occupy the space made available by the search result 133 being removed.

Figure 5:
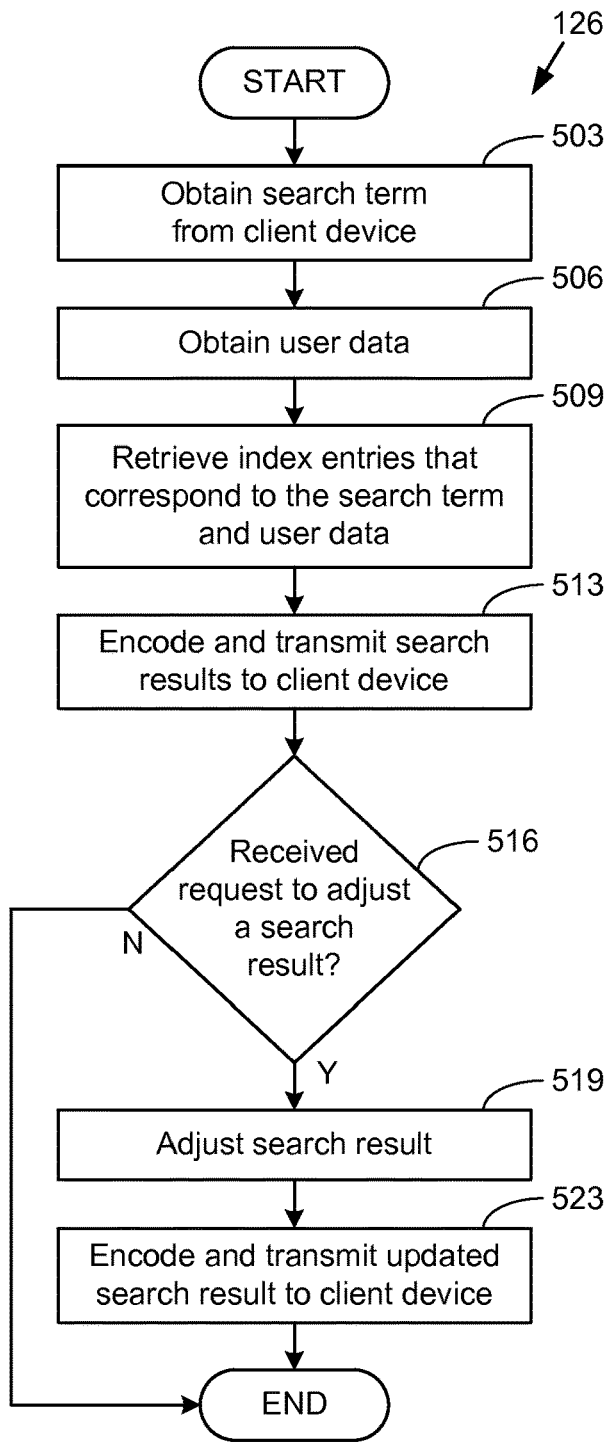
FIG. 5 is a flowchart illustrating an example of functionality implemented by a search processor in an enterprise computing environment.

With reference to FIG. 5, shown is a flowchart that provides an example of a portion of the operation of the search processor 126. In particular, FIG. 5 provides an example of the search processor 126 obtaining a search term from a client device 106 and then transmitting search results 133 to the client device 106. It is understood that the flowchart of FIG. 5 provides merely an example of the many different types of functional arrangements that may be performed to implement the operation the search processor 126 as described herein. Additionally, the flowchart of FIG. 5 may be viewed as depicting an example of steps of a method implemented in the enterprise computing environment 103.

Beginning with step 503, the search processor 126 obtains a search term from the client device 106. Such a search term in some examples includes one or more words or phrases. Next, at step 506, the search processor 126 obtains user data 136 that corresponds to the user operating the client device 106 that submitted the search term. As described above, such user data 136 includes, for example, data that indicates a user's job title or other role in an enterprise or calendar data that indicates a task that the user is scheduled to perform.

Next, at step 509, the search processor 126 retrieves data for the index entries 143 that correspond to the search term and the retrieved user data 136. In one approach, this data is retrieved by modifying the search term based on the user data 136. For example, words can be appended to the search term that was submitted by the client device 106 based on the user's role in the enterprise or based on a task that the user is scheduled to perform. In another approach, data that corresponds to the search term that was provided by the client device 106 is obtained, and the obtained data is filtered based on the user's role in the enterprise or based on a task that the user is scheduled to perform.

At step 513, the search processor 126 then encodes and transmits search results 133 to the client device 106. A search result 133 includes, for example, an encoded representation of a portion of a document file 146 that is within a specified contextual boundary. The encoded representation in some examples includes client-side code, such as scripting code, that is executable by the search client 156. The search results 133 in some examples are also ordered according to the relevancies of the search results 133 based on the user data 136 that is associated with the client device 106.

Next, as shown at step 516, the search processor 126 determines whether the search processor 126 has received a request to adjust a search result 133. For example, the client device 106 can transmit a request for a search result 133 to include additional or less content than was previously included at step 513. If a request was not received by the search processor 126, the process ends. Otherwise, if a request was received by the search processor 126, the search processor 126 moves to step 519 and adjusts the search result 133 that was requested by, for example, retrieving the additional content from the search result 133 or determining which content to omit from the updated search result 133. If the request for adjusted search results 133 involves a request to search processor 126, the search processor 126 then encodes and transmits the updated search result 133 to the client device 106, as shown at step 523. Thereafter, the process ends.

The flowcharts of FIGS. 3-5 show examples of the functionality and operation of implementations of components described herein. The components of the networked environment 100 described herein can be embodied in hardware, software, or a combination of hardware and software. If embodied in software, each step in the flowcharts of FIGS. 3-5 may represent a module or a portion of code that comprises computer instructions to implement the specified logical functions. The computer instructions may be embodied in the form of, for example, source code that comprises human-readable statements written in a programming language or machine code that comprises machine instructions recognizable by a suitable execution system, such as a processor in a computer system or other system. If embodied in hardware, each step may represent a circuit or a number of interconnected circuits that implement the specified logical functions.

Although the flowcharts show a specific order of execution, it is understood that the order of execution may differ from that which is shown. For example, the order of execution of two or more steps may be switched relative to the order shown. Also, two or more steps shown in succession may be executed concurrently or with partial concurrence. Further, in some examples, one or more of the steps shown in the flowcharts may be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The enterprise computing environment 103, the client device 106, and other components described herein may each include at least one processing circuit. Such a processing circuit comprises, for example, one or more processors and one or more storage devices that are coupled to a local interface. The local interface comprises, for example, a data bus with an accompanying address/control bus or any other suitable bus structure.

A storage device for a processing circuit store data and components that are executable by the one or more processors of the processing circuit. In some examples, the management system 116, the search engine 119, the search client 156, the management component 159, and other components may be stored in one or more storage devices and be executable by one or more processors. Also, the data store 113 in some examples is embodied in the one or more storage devices.

The management system 116, the search engine 119, the search client 156, the management component 159, and other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that comprise software or computer instructions can be embodied in any non-transitory computer-readable medium for use by or in connection with an instruction execution system such as, for example, a processor in a computer system or other system. Such a computer-readable medium may contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

The examples described above are merely examples of implementations to set forth for a clear understanding of the principles of the disclosure. Many variations and modifica- Therefore, the following is claimed:

1. A method for obtaining search results in a search client, comprising:
 displaying, by a computing device associated with a user and enrolled in a management service that is operated by an enterprise, a plurality of user interface elements on a gesture-enabled input device;
 obtaining, in the computing device, a search term from the user in response to the user interacting with at least one of the user interface elements;
 transmitting, from the computing device and in response to the gesture-enabled input device detecting a first gesture, the search term to a search engine;
 obtaining, in the computing device, a plurality of search results from the search engine, each one of the plurality of search results comprising a representation of a portion of a document file that is within a specified contextual boundary, the search results being based on a role of the user within the enterprise, the role determined by at least one of a job title or calendar data; and
 generating, by the computing device, a rendering of the search results that comprises contextual content for the search term.

2. The method of claim 1, further comprising:
 obtaining, in the computing device, a user request to adjust an amount of the contextual content for the search term that is included in the rendering of the search results; and
 generating, by the computing device, an updated rendering of the search results that comprises an adjusted amount of contextual content for the search term.

3. The method of claim 2, wherein the user request comprises a request for additional contextual content for the search term to be rendered by the computing device.

4. The method of claim 2, wherein the user request comprises a request for less contextual content for the search term to be rendered by the computing device.

5. The method of claim 2, wherein obtaining the user request to adjust the amount of contextual content that is rendered for the search results comprises detecting a second gesture using the gesture-enabled input device.

6. The method of claim 5, wherein the second gesture comprises a screen press having a time duration, and wherein the adjusted amount of contextual content for the search term corresponds to the time duration of the screen press.

7. The method of claim 1, further comprising:
 obtaining, in the computing device, a user request to remove the rendering of the search results; and
 removing, by the computing device, the rendering of the search results.

8. The method of claim 7, wherein obtaining the user request to remove the rendering of the search results comprises detecting a second gesture using the gesture-enabled input device.

9. The method of claim 1, further comprising transmitting, from the computing device, user preference data that specifies a default contextual boundary for the user in response to detecting the first gesture.

10. A non-transitory computer-readable medium embodying computer instructions executable by a computing device, the computer instructions being configured to cause the computing device to at least:
 display a plurality of user interface elements on a gesture-enabled input device, the gesture-enabled input device in communication with the computing device, the computing device associated with a user and enrolled in a management service that is operated by an enterprise;
 obtain a search term from the user in response to the user interacting with at least one of the user interface elements;
 transmit the search term to a search engine and in response to the gesture-enabled input device detecting a first gesture;
 obtain a plurality of search results from the search engine, each one of the plurality of search results being based on a role of the user in the enterprise, the role determined by at least one of a job title or calendar data; and
 generate a rendering of the search results that comprises contextual content for the search term.

11. The non-transitory computer-readable medium of claim 10, wherein the computer instructions are further configured to cause the computing device to at least:
 obtain a user request to adjust an amount of the contextual content for the search term that is included in the rendering of the search results; and
 generate an updated rendering of the search results that comprises an adjusted amount of contextual content for the search term.

12. The non-transitory computer-readable medium of claim 11, wherein the user request comprises a request for additional contextual content for the search term to be rendered by the computing device.

13. The non-transitory computer-readable medium of claim 11, wherein the user request comprises a request for less contextual content for the search term to be rendered by the computing device.

14. The non-transitory computer-readable medium of claim 10, wherein the computer instructions are further configured to cause the computing device to at least:
 obtain a user request to remove the rendering of the search results; and
 remove the rendering of the search results.

15. The non-transitory computer-readable medium of claim 10, wherein the computer instructions are further configured to cause the computing device to at least generate the rendering of the search results using a document structure and a document layout provided by the search engine.

16. The non-transitory computer-readable medium of claim 15, wherein the document structure defines a logical structure of content, and wherein the document layout defines a visual layout of the content.

17. A system for obtaining search results in a search client, comprising:
 a computing device;
 a gesture-enabled input device in communication with the computing device; and
 a search client executable by the computing device, wherein the search client, when executed by the computing device, is configured to cause the computing device to at least:
 display a plurality of user interface elements on the gesture-enabled input device;
 obtain a search term from a user in response to the user interacting with at least one of the user interface elements;

transmit the search term to a search engine in response to the gesture-enabled input device detecting a first gesture;

obtain a plurality of search results from the search engine, each one of the plurality of search results being based on a role of the user within an enterprise, the role determined by at least one of a job title or calendar data; and generate a rendering of the search results using a document structure and a document layout provided by the search engine, wherein the rendering of the search results comprises contextual content for the search term.

18. The system of claim 17, wherein the search client is further configured to cause the computing device to at least:

obtain a user request to increase an amount of the contextual content for the search term that is included in the rendering of the search results; and generate an updated rendering of the search results that comprises an increased amount of contextual content for the search term.

19. The system of claim 17, wherein the search client is further configured to cause the computing device to at least:

obtain a user request to decrease an amount of the contextual content for the search term that is included in the rendering of the search results; and generate an updated rendering of the search results that comprises an increased amount of contextual content for the search term.

20. The system of claim 17, wherein the search client is further configured to cause the computing device to at least:

transmit user preference data that specifies a default contextual boundary for the user in response to detecting the first gesture.

* * * * *